United States Patent Office 3,099,597
Patented July 30, 1963

3,099,597
HALOPHENYL ARYLPHOSPHONOTHIOATES
John P. Chupp, Kirkwood, and Peter E. Newallis, Crestwood, Mo., assignors to Monsanto Chemical Company, St. Louis, Mo., a corporation of Delaware
No Drawing. Filed Mar. 14, 1961, Ser. No. 95,494
14 Claims. (Cl. 167—30)

This invention relates to novel arylphosphonothioates and to the preparation thereof. This invention also relates to insecticidal compositions comprising the arylphosphonothioates of this invention as an active ingredient.

The arylphosphonothioates of this invention can be represented by the formula

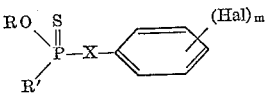

wherein "Hal" means halogen of atomic number in the range of 16 to 36 (i.e. chlorine or bromine), wherein $m$ is a whole number from 1 to 5, wherein X is a chalkogen of atomic weight less than 40 (i.e. sulfur or oxygen), wherein R is a lower alkyl radical (i.e. methyl, ethyl, propyl, butyl, amyl, and the various isomeric forms thereof containing up to 5 carbon atoms), and wherein R' is an aromatic hydrocarbon radical of the benzene series, e.g. phenyl, tolyl, xylyl, ethylphenyl, isopropylphenyl, t-butylphenyl, and the various isomeric forms thereof containing up to 10 carbons atoms.

The method of this invention comprises reacting

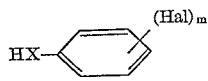

wherein "Hal," $m$ and X have the aforedescribed significance with

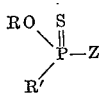

wherein R and R' have the aforedescribed significance and wherein Z is a halogen of atomic number in the range of 16 to 36 (i.e. chlorine or bromine), in the presence of a hydrogen halide scavenging agent (e.g. sodium carbonate, potassium carbonate, the tertiary organic amines such as triethylamine, tripropylamine, tributylamine, dimethylaniline, pyridine, 1-pipecoline, lutidine, etc.) in an amount at least sufficient to absorb the hydrogen halide by-product. The scavenging agent can be added in an equivalent amount at the beginning of the reaction or throughout the course of the reaction. Ordinarily the respective reactants will be employed in substantially equimolecular amounts. While a wide range of reaction temperatures can be employed provided the system is fluid (i.e. a reaction temperature above the freezing point of the system up to and including the system's boiling point) it is preferred to employ a reaction temperature in the range of about 20° C. to about 120° C. Where and when desired an inert organic solvent can be used (e.g. benzene, toluene, xylene, acetone, butanone, dioxane, etc.).

As illustrative of operable phenol or thiophenol reactants in the process of this invention are 2-chlorophenol, 3-chlorophenol, 3-bromophenol, 4-chlorophenol, 4-bromophenol, 2,4-dichlorophenol, 3,4-dichlorophenol, 2,4-dibromophenol, 3,4-dibromophenol, 3-bromo-4-chlorophenol, 2-chloro-4-bromophenol, 2,4,6-trichlorophenol, 2,4,6-tribromophenol, 2,6-dibromo-4-chlorophenol, 2,4,5-trichlorophenol, 2,4,5-tribromophenol, 2,3,4,5-tetrachlorophenol, 2,3,4,5,6-pentachlorophenol, and the corresponding thiophenols (e.g. 4-chlorothiophenol, 3,4-dichlorothiophenol, 2,4,5-trichlorothiophenol, 4-bromothiophenol, 2,3,4,5,6-pentachlorothiophenol, etc.).

The phenolic reactants in general which will be used are those of the formula

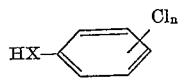

wherein $n$ is a whole number from 1 to 3 and wherein X is a chalkogen of atomic weight less than 40 (i.e. sulfur or oxygen, preferably oxygen).

As illustrative of phosphonohalidothionate reactants of the process of this invention are O-methyl phenylphosphonochloridothionate, O-ethyl phenylphosphonochloridothionate, O-(n-propyl) phenylphosphonochloridothionate, O-isopropyl phenylphosphonobromidothionate, O-(n-butyl) phenylphosphonochloridothionate, O-(n-amyl) phenylphosphonobromidothionate, O-ethyl m-tolylphosphonochloridothionate, O-ethyl p-cumylphosphonochloridothionate, O-ethyl p-t-butylphenylphosphonochloridothionate, etc. The phosphonohalidothionate reactants in general which will be used in the process of this invention are the phenylphosphonochloridothionates of the formula

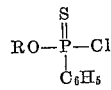

wherein R is an alkyl radical containing 1 to 3 carbon atoms.

As illustrative of the method of this invention but not limitative thereof is the following:

*Example I*

To a suitable reaction vessel equipped with an agitator, reflux condenser and thermometer is charged approximately 4.05 parts by weight of 4-chlorothiophenol, approximately 125 parts by weight of benzene, and approximately 4.1 parts by weight of triethylamine. To this mixture while agitating is added 6.6 parts by weight of O-ethyl phenylphosphonochloridothionate and the mixture heated at 75–80° C. for 5 hours. The reaction mass is cooled to room temperature, and then quenched with water. The organic layer is then separated and washed first with dilute aqueous sodium carbonate and then with water. The so-washed organic solution is then stripped of volatiles under vacuum. The residue, a solid (which on recrystallizing from hexane gave white needles melting at 84–85° C.), is O-ethyl S-(4-chlorophenyl) phenylphosphonodithioate. *Analysis.*—Theory: 9.7% P, 20.0% S, 11.1% Cl. Found: 9.0% P, 20.1% S, 10.9% Cl.

*Example II*

Employing the procedure of Example I but replacing O-ethyl phenylphosphonochloridothionate with a substantially equimolecular amount of O-methyl phenylphosphonobromidothionate there is obtained O-methyl S-(4-chlorophenyl) phenylphosphonodithioate which is soluble in acetone but insoluble in water.

*Example III*

Employing the procedure of Example I but replacing O-ethyl phenylphosphonochloridothionate with a substantially equimolecular amount of O-(n-amyl) phenylphosphonochloridothionate there is obtained O-(n-amyl) S-(4-chlorophenyl) phenylphosphonodithioate which is soluble in acetone but insoluble in water.

*Example IV*

Employing the procedure of Example I but replacing 4-chlorothiophenol with a substantially equimolecular amount of 4-bromothiophenol there is obtained O-ethyl S-(4-bromophenyl) phenylphosphonodithioate which is soluble in acetone but insoluble in water.

Example V

To a suitable reaction vessel equipped with a thermometer, agitator and reflux condenser is charged approximately 12.2 parts by weight of 2,4,6-trichlorophenol, approximately 100 parts by weight of benzene, and approximately 7.1 parts by weight of triethylamine. To this mixture and while agitating is added 13.2 parts by weight of O-ethyl phenylphosphonochloridothionate. The reaction mixture is heated to the reflux temperature and refluxed for 4 hours. The reaction mass is then cooled to room temperature and then quenched with water. The organic layer is then separated and washed first with dilute aqueous sodium carbonate and then with water. The so-washed solution is then stripped of volatiles under vacuum. The residue, a pale yellow liquid is O-ethyl O-(2,4,6-trichlorophenyl) phenylphosphonothioate. *Analysis.*—Theory: 8.1% P, 8.4% S. Found: 8.1% P, 8.5% S.

Example VI

Employing the procedure of Example V but replacing 2,4,6-trichlorophenol with a substantially equimolecular amount of 2,4-dichlorophenol there is obtained O-ethyl O-(2,4-dichlorophenyl) phenylphosphonothioate which is insoluble in water.

Example VII

Employing the procedure of Example V but replacing 2,4,6-trichlorophenol with a substantially equimolecular amount of 4-chlorophenol there is obtained O-ethyl O-(4-chlorophenyl) phenylphosphonothioate which is insoluble in water but soluble in acetone.

Example VIII

Employing the procedure of Example V but replacing O-ethyl phenylphosphonochloridothionate with a substantially equimolecular amount of O-methyl phenylphosphonochloridothionate there is obtained O-methyl O-(2,4,6-trichlorophenyl) phenylphosphonothioate which is insoluble in water.

Example IX

Employing the procedure of Example V but replacing O-ethyl phenylphosphonochloridothionate with a substantially equimolecular amount of O-(n-propyl) phenylphosphonochloridothionate there is obtained O-(n-propyl) O-(2,4,6-trichlorophenyl) phenylphosphonothioate which is insoluble in water.

The methods by which the phosphonothioates of this invention are isolated will vary slightly with the reactants employed and the product produced. Further purification by selective solvent extraction or by absorptive agents such as activated carbon or clays can precede the removal of the inert organic liquid or solvent when such is employed. Additionally an inert organic solvent can be added to and in the purification by absorptive agents. However, the product is generally satisfactory for insecticidal purposes without further purification.

As illustrative of other phosphonothioates of this invention are

O-methyl O-(4-chlorophenyl) phenylphosphonothioate
O-methyl O-(2,4-dichlorophenyl) phenylphosphonothioate
O-methyl S-(2,4-dichlorophenyl) phenylphosphonodithioate
O-methyl O-(2,4,5-trichlorophenyl) phenylphosphonothioate
O-methyl S-(2,4,5-trichlorophenyl) phenylphosphonodithioate
O-methyl S-(2,4,6-trichlorophenyl) phenylphosphonodithioate
O-methyl O-(2,3,4,5,6-pentachlorophenyl) phenylphosphonothioate
O-methyl O-(2,4-dibromophenyl) phenylphosphonothioate
O-ethyl S-(2,4-dichlorophenyl) phenylphosphonodithioate
O-ethyl O-(2,4,5-trichlorophenyl) phenylphosphonothioate
O-ethyl O-(2,3,4,5,6-pentachlorophenyl) phenylphosphonothioate
O-ethyl S-(2,3,4,5,6-pentachlorophenyl) phenylphosphonodithioate
O-(n-propyl) O-(4-chlorophenyl) phenylphosphonothioate
O-(n-propyl) O-(2,4,6-trichlorophenyl) phenylphosphonothioate
O-(n-propyl) S-(2,4,6-trichlorophenyl) phenylphosphonodithioate
O-isopropyl O-(4-chlorophenyl) phenylphosphonothioate
O-(n-butyl) O-(2,4,6-trichlorophenyl) phenylphosphonothioate
O-(isoamyl) O-(2,4,6-trichlorophenyl) phenylphosphonothioate
O-ethyl O-(4-chlorophenyl) m-tolylphosphonothioate
O-ethyl O-(2,4-dichlorophenyl) p-cumylphosphonothioate
O-ethyl S-(4-bromophenyl) p-cumylphosphonodithioate
O-ethyl O-(4-chlorophenyl) p-t-butylphenylphosphonothioate Of these phosphonothioates a particularly useful group are the phenylphosphonothioates of the formula

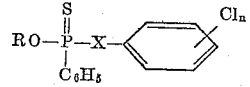

wherein $n$ is a whole number from 1 to 3, wherein R is an alkyl radical containing 1 to 3 carbon atoms, and wherein X is a chalkogen of atomic weight less than 40 (i.e. sulfur or oxygen, usually oxygen).

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The phosphonothioates of this invention are effective against a wide variety of insects and as illustrative of their activity is the following:

A rimless, 25 x 200 mm. culture tube is rinsed with acetone and is placed in a holding block. The tube is filled with 50 cc. of distilled water. Next 0.1 cc. of O-ethyl O-(2,4,6-trichlorophenyl) phenylphosphonothioate is dissolved in acetone to make a 1% by weight concentrate of the test compound. 0.05 ml. of this concentrate is pipetted into the culture tube containing the distilled water. The tube is then stoppered with an acetone washed rubber stopper and shaken vigorously to facilitate complete mixing. Approximately 25 early fourth instar yellow fever mosquito larvae (*Aëdes aegypti*) are transferred to the tube with the aid of a pipette. The larvae are held in the test tube at room temperature for 24 hours at which time mortality observations are taken. This procedure is repeated at decreasing concentrations and a 100% kill was observed at a concentration of 0.063 p.p.m. In the same evaluation procedure but employing a different colony of *Aëdes aegypti* larvae O-ethyl S-(4-chlorophenyl) phenylphosphonodithioate exhibited a 100% kill at a concentration of 0.4 p.p.m.

A 1% by weight concentrate is prepared by dissolving O-ethyl O-(2,4,6-trichlorophenyl) phenylphosphonothioate in 10 ml. of acetone. A 0.25 cc. tuberculin, B-D Yale syringe is filled with this concentrate and placed in a micro-injection apparatus. The injector lever is pressed several times to make certain no air bubbles are trapped in the needle and the needle is wiped with filter paper to remove any excess solution. The injector lever is pressed once to deliver one microliter which is applied directly to each of 12 lima bean leaf discs 0.25 inch in diameter. Individual second instar southern armyworm larvae (*Prodenia eridania*) are placed on each disc and the disc encaged with a plastic cap. After 48 hours at room temperature mortality observations are made. This procedure is repeated at decreasing concentrations and a 100% kill was observed at a concentration of 0.063% by weight. In the same evaluation procedure but employing a different colony of southern armyworm larvae (*Prodenia eridania*) O-ethyl S-4-chlorophenyl) phenylphosphonodithioate was observed as giving a 100% kill at a concentration of 0.2% by weight.

Although the arylphosphonothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the arylphosphonothioates of this invention are dispersed, it means that particles of an arylphosphonothioate of this invention can be molecular in size and held in true solution in a suitable organic solvent. It means further, that the particles can be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they can be actually dissolved in the semi-solid or held in suspension in the semi-solid with the aid of suitable wetting or emulsifying agents. The term "dispersed" also means that the particles can be mixed with and distributed throughout a solid carrier providing a mixture in particulate form, e.g. pellets, granules, powders, or dusts. The term "dispersed" also includes mixtures which are suitable for use as aerosols including solutions, suspensions or emulsions of an arylphosphonothioate of this invention in a carrier such as dichlorodifluoromethane and the like fluorochloroalkanes which boil below room temperature at atmospheric pressure.

In the instant specification and appended claims it is to be understood that the expression "extending agent" includes any and all of those substances in which an arylphosphonothioate of this invention is dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of arylphosphonothioate of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of arylphosphonothioate employed to supply the desired dosage generally will be in the range of 0.001 to 50 percent by weight. When the extending agent is a semi-solid or solid, the concentration of arylphosphonothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared insecticidal spray or particulate solid. In such a concentrate composition, the arylphosphonothioate generally will be present in a concentration of 5 to 95 percent by weight, the residue being any one or more of the well known insecticidal adjuvants, such as the various surface active agents (e.g. detergents, a soap or other emulsifying or wetting agent), surface-active clays, solvents, diluents, carrier media, adhesives, spreading agents, humectants, and the like.

There are a large number of organic liquids which can be used for the preparation of solutions, suspensions or emulsions of the arylphosphonothioates of this invention. For example, isopropyl ether, acetone, methyl ethyl ketone, dioxane, cyclohexanone, carbon tetrachloride, ethylene dichloride, tetrachloroethane, hexane, heptane and the like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the arylphosphonothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The arylphosphonothioates of this invention are preferably supplied to the insect pests or to the environment of the insect pests in the form of emulsions or suspensions. Emulsions or suspensions are prepared by dispersing an arylphosphonothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compound of this invention in order to secure better wetting and spreading of the active ingredient in the water vehicle or carrier in which it is insoluble through lowering the surface tension of the water (see also Frear, "Chemistry of Insecticides, Fungicides and Herbicides," second edition, page 280). These surfactants include the well-known capillary-active substances which may be anion-active (or anionic), cation active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The arylphosphonothioates of this invention can be dispersed by suitable methods (e.g. tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include for example, such materials organic nature as powdered cork, powdered wood, and powdered walnut shells. The preferred solid carrier are the adsorbent clays, e.g. Attapulgus clay. These mixtures can be used for insecticidal purposes in the dry form, or, by addition of water-soluble surfactants or wetting agents the dry particulate solids can be rendered wettable by water so as to obtain stable aqueous dispersions or suspensions suitable for use as sprays.

For special purposes the arylphosphonothioates of this invention can be dispersed in a semi-solid extending agent such as petrolatum or soap (e.g. sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of an arylphosphonothioate of this invention with a water-soluble surfactant which lowers the surface tension of water in the weight proportions of 0.1 to 15 parts of surfactant with sufficient of the arylphosphonothioate of this invention to make 100 parts by weight. Such a concentrate is particularly adapted to be made into a spray for combatting various forms of insect pests by the addition of water thereto. As illustrative of such a concentrate is an intimate mixture of 95 parts by weight of O-ethyl O-(2,4,6-trichlorophenyl) phenylphosphonothioate and 5 parts by weight of a water-soluble non-ionic surfactant such as the polyoxyethylene derivative of sorbitan monolaurate.

Another useful concentrate adapted to be made into a spray for combatting a variety of insect pests is a solution (preferably as concentrated as possible) of an arylphosphonothioate of this invention in an organic solvent therefor. The said liquid concentrate preferably contains dissolved therein a minor amount (e.g. 0.5 to 10 percent by weight of the weight of the new insecticidal agent) of a surfactant (or emulsifying agent), which surfactant is also water-soluble. As illustrative of such a concentrate is a solution of O-ethyl O-(4-chlorophenyl) phenylphosphonothioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydride (e.g. sorbitan) which materials usually contain 15 to 30 moles of ethylene oxide per mole of the hexitol anhydride or the alkylphenol.

The arylphosphonothioates of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the arylphosphonothioates of this invention either per se or compositions comprising same is supplied to the insect pests or to their environment in a lethal or toxic amount. This can be done by dispersing the new insecticidal agent or insecticidal composition comprising same in, on or over an infested environment or in, on or over environment the insect pests frequent, e.g. agricultural soil or other growth media or other media infested with insect pests or attractable to the pests for habitational or sustenance or propagational purposes, in any conventional fashion which permits contact between the insect pests and the arylphosphonothioates of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested envronment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. An arylphosphonothioate of the formula

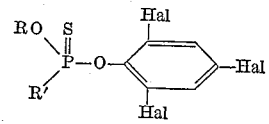

wherein "Hal" means halogen of atomic number in the range of 16 to 36, wherein R is a lower alkyl radical, and wherein R' is an aromatic hydrocarbon radical of the benzene series containing 6 to 10 carbons atoms selected from the group consisting of phenyl and alkyl substituted phenyl.

2. A phenylphosphonothioate of the formula

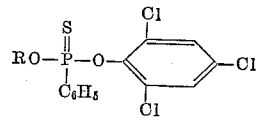

wherein R is an alkyl radical containing 1 to 3 carbon atoms.

3. O-ethyl O-(2,4,6-trichlorophenyl)phenylphosphonothioate.

4. O-methyl O-(2,4,6-trichlorophenyl)phenylphosphonothioate.

5. An insecticidal composition comprising a compound of claim 1 dispersed in an extending agent.

6. An insecticidal composition comprising a compound of claim 1 dispersed in an extending agent selected from the group consisting of solid and semi-solid extending agents, the composition containing 0.1 to 25 percent by weight of said compound of claim 1.

7. An insecticidal composition comprising a compound of claim 1 dispersed in a liquid extending agent, the composition containing 0.001 to 50 percent by weight of said compound of claim 1.

8. An insecticidal concentrate comprising a compound of claim 1 and an insecticidal adjuvant, said concentrate containing from 5 to 95 percent by weight of the compound of claim 1.

9. An insecticidal concentrate comprising a compound of claim 1 dispersed in an organic solvent therefor and having dissolved therein a minor amount of surfactant, said concentrate forming an emulsion with water upon agitation therewith.

10. An insecticidal concentrate adapted to be made into a sprayable composition by the addition of water comprising a compound of claim 1 in admixture with a water-soluble surfactant in the weight proportion of 0.1 to 15 parts of surfactant and sufficient of said compound of claim 1 to make 100 parts by weight.

11. The method of controlling insects which comprises contacting the insects with a toxic amount of a compound of claim 1.

12. The method for protection of plants against insect attack which comprises applying to the plant an insecticidal amount of a compound of claim 1.

13. The method of controlling insects which comprises contacting the insects with a toxic amount of a compound of claim 2.

14. The method of protection of plants against insect attack which comprises applying to the plant an insecticidal amount of a compound of claim 2.

References Cited in the file of this patent

UNITED STATES PATENTS

| | | |
|---|---|---|
| 2,962,520 | Schrader | Nov. 20, 1960 |
| 2,967,884 | Dunn et al. | Jan. 10, 1961 |

FOREIGN PATENTS

| | | |
|---|---|---|
| 1,076,129 | Germany | Feb. 25, 1960 |